United States Patent
Komatsu

(10) Patent No.: US 6,254,911 B1
(45) Date of Patent: Jul. 3, 2001

(54) METHOD OF MAKING PLATE-LIKE FROZEN RAW HAMBURGER-LIKE MATTER PACKAGED BY FILM

(75) Inventor: Shinji Komatsu, Tokyo (JP)

(73) Assignee: Komatsu Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/432,275

(22) Filed: Nov. 2, 1999

(30) Foreign Application Priority Data

Mar. 30, 1999 (JP) .................................................. 11-088244

(51) Int. Cl.[7] ................. B65B 9/00; A23B 4/06
(52) U.S. Cl. ................. 426/393; 426/129; 426/410; 426/513; 426/414; 426/646; 53/122; 53/436
(58) Field of Search ..................... 426/414, 129, 426/410, 393, 513, 272, 646, 105; 53/436, 122

(56) References Cited

U.S. PATENT DOCUMENTS

| | | | |
|---|---|---|---|
| 3,542,570 | * 11/1970 | Bush et al. ............................ | 426/413 |
| 3,863,020 | * 1/1975 | Robinson .............................. | 426/513 |
| 4,015,021 | * 3/1977 | Harima et al. ........................ | 426/393 |
| 4,792,457 | * 12/1988 | Brna et al. ............................ | 426/574 |
| 5,347,792 | * 9/1994 | Meli et al. ............................. | 53/450 |
| 5,701,724 | * 12/1997 | Meli et al. ............................. | 53/451 |
| 5,843,500 | * 12/1998 | Guarino ................................ | 426/91 |

* cited by examiner

*Primary Examiner*—Milton Cano
*Assistant Examiner*—Sherry A. Dauerman
(74) *Attorney, Agent, or Firm*—Oblon, Spivak, McClelland, Maier & Neustadt, P.C.

(57) ABSTRACT

A method of making a plate-like frozen raw hamburger-like matter includes: a filling step for filling a constitutional material of the raw hamburger-like matter between a first thermal seal a second thermal seal, provided in a direction perpendicular to the conveying direction; a deaerating step of pressing the film so that the filled constitutional material is extended until the second thermal seal is provided; a forming step for forming the plate-like raw hamburger-like matter by equalizing the constitutional matter, therein; and a freezing step for maintaining its shape by rapidly freezing the package bag enclosing the raw hamburger-like matter.

2 Claims, 11 Drawing Sheets

METHOD OF MAKING PLATE-LIKE FROZEN RAW HAMBURGER-LIKE MATTER PACKAGED BY FILM

BACKGROUND OF THE INVENTION

1. Field of the Invention

The present invention relates to a method of making a plate-like frozen raw hamburger-like matter packaged by a film, wherein the matter is packaged in a state of being formed in a plate-like shape, maintained to be in the state by freezing, and edibly supplied by opening a package bag and by cooking in this plate-like state.

2. Discussion of Background

At present, most of hamburger-like matters supplied for domestic consumption and business consumption are brought into distribution in a chilled or frozen state by packaging after filling and forming constitutional materials into a form.

However, in such a hamburger-like matter, because it is subjected to packaging, for example, filling in and closing a bag after forming using the form, excessive air is apt to intrude into a package in a step of packaging; and deterioration of quality of the hamburger-like matter such as freezer burn, oil burn, run-off of an extract, such as a gravy contained in the hamburger-like matter, is apt to be introduced with time, which deterioration is caused by the air and a space in the package. Therefore, it is not rare that this kind of hamburger-like matter is difficult to be stored for a long term, and there are many cases where one is obliged to add a preservative.

In consideration of separately packing after forming using the form, there is a limit in finishing the hamburger-like matter to be thin. Therefore, in a conventional technique, this kind of the hamburger-like matter is relatively thick, whereby it is not rare that thawing is necessary before heating in a final cooking and that a substantial time is necessary for cooking.

Further, in order to make a weight of and a shape of a product uniform, a special consideration, for example, for filling constitutional materials into the form is necessary.

SUMMARY OF THE INVENTION

It is an object of the present invention to solve the above-mentioned problems inherent in the conventional technique and to easily and stably make a hamburger-like matter in a state that deterioration of quality, such as freezer burn, occurs as little as possible and to form the hamburger-like matter such that it is suitable for transportation, storage, and preservation; it is easily cooked; and it has a shape suitable for supplying as a food, for example, it can easily be sandwiched.

According to an aspect of the present invention, there is provided a method of making a plate-like frozen raw hamburger-like matter packaged by a film comprising steps of:

(1) sequentially and successively forming a three-sided seal package bag or a four-sided seal package bag by a first thermal seal, continuously provided in a direction along with a conveying direction of the film, and a second thermal seal, provided in a perpendicular to a conveying direction of the film with an interval, and filling constitutional materials of the raw hamburger-like matter between the second thermal seal, previously provided, and the second thermal seal, subsequently provided, while conveying the film having a sealant layer, to be thermally sealed, so that interfacial peeling, ply separation, or cohesive failure can occur when desired;

(2) deaerating by pressing the film so that the filled constitutional materials are spread after the above filling step and before providing the subsequently provided second thermal seal;

(3) forming the raw hamburger-like matter by equalizing the packed constitutional materials with the package bag, filled by the constitutional materials, pressing so that the constitutional materials are spread in the package bag, after the above deaerating step; and (4) freezing for maintaining a shape of the raw hamburger-like matter by rapidly freezing the package bag enclosing the raw hamburger-like matter, equalized to be like a plate, after the above forming step.

In this, the raw hamburger-like matter contains one or more kinds of minced or mashed fundamental materials of flesh (e.g. beef, pork, horse meat, sheep meat, goat meat, flesh of domestic fowls, fish meat such as whale, sardine and shrimp, and vegetable protein) and one kind or more of additional materials as much as an appropriate amount of a liaison (e.g. bread crumbs and wheat flours, minced vegetable such as onion chopped into fine pieces, seasonings, and spices). In this specification, the raw hamburger-like matter means a matter, which is not finally cooked and edible by cooking. The constitutional materials mean the fundamental materials and the additional materials.

Since, in the filling step, the three-sided package bag or the four-sided package bag is formed by the film having the thermally sealed sealant layer so that the interfacial peeling, the ply separation, or the cohesive failure can occur, the raw hamburger-like matter, formed like a plate and frozen for maintaining the shape according to this method of making, is easily taken out by breaking the thermal seal from an arbitrarily chosen side of the package bag and by pulling portions of the film on both sides of the package bag in directions of mutual separation, whereby the raw hamburger-like matter in an enclosed and frozen condition is easily taken out from the package bag.

Further, in the deaerating step, it is possible to remove excessive air in the constitutional materials, enclosed in the package bag, by removing the air as much as possible before subsequently providing the second thermal seal. Further, the constitutional materials are densely spread in an area between the previously provided second thermal seal and the subsequently provided second thermal seal in the film, formed in a flat cylindrical shape before providing the subsequently provided second thermal seal, whereby it is possible to prevent the air, remaining in spaces to be filled in a package bag, from remaining. As a result, it is possible to seal the constitutional materials, in a state that the excessive air is not left as throughly as possible in the package bag, to prevent a change of a quality of the raw hamburger-like matter, caused by such air, from occurring as throughly as possible, and to give durability to storage by freezing for a long term.

Further, the constitutional materials, filled in the package bag in the forming step, are formed to be the plate-like raw hamburger-like matter, of which shape corresponds to an inner space of the package bag. Specifically, a plate-like shape of the constitutional materials corresponding to a flat and rectangular inner space, formed by an inner edge of the first thermal seal and an inner edge of the second thermal seal, both provided in the package bag. Thus formed plate-like raw hamburger-like matter is covered by the film without an interval between an outer surface of the raw hamburger-like matter and the film after the deaerating step, whereby it is possible to prevent run-off of an extract, such as a gravy, contained in the raw hamburger-like matter from occurring with time as throughly as possible. By regularly forming the first thermal seal and the second thermal seal, it is possible to make each of the raw hamburger-like matters, enclosed in each of the continuously formed package bags, to have substantially equal weights and shapes, whereby commodities having identical specifications can be stably supplied.

Further, because the hamburger-like matter is formed in a state that the constitutional materials are enclosed in the package bag, it is possible to thin the formed raw hamburger-like matter without trouble; and the raw hamburger-like matter can be properly frozen in a short time in the freezing step. Further, it is possible to uniformly bake the constitutional materials, filled in the package bag, when a final consumer opens the package bag and heats it to supply a food, and accordingly these contents can be cooked in a short time. Further, it is possible to easily form the plate-like raw hamburger-like matter in a substantially rectangular shape, which is easily eaten by sandwiching between bread or by topping the bread.

Further, the raw hamburger-like matter, obtained by forming the substantially rectangular plate-like constitutional materials in the package bag in the forming process, is supplied to a final consumer in a state of the substantially rectangular plate-like shape until the final consumer eats; and a shape of a cooked hamburger-like matter, obtained by cooking the raw hamburger-like matter, after the final consumer opens the package bag, is maintained to be in the substantially rectangular plate-like shape as completely as possible.

Further, it is possible to store the raw hamburger-like matter for a long period.

BRIEF DESCRIPTION OF THE DRAWINGS

A more complete understanding of the invention and meaning of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 13 as follows, wherein the same numerical references are used for the same or similar portions and description of these portions is omitted.

EMBODIMENT

A method of manufacture according to the embodiment is to make a plate-like frozen raw hamburger-like matter M, which is packaged by a film in a substantially square plate-like shape, maintained to be in that state by freezing, and edible by cooking in a plate-like condition after opening a package bag H.

Figure 1:
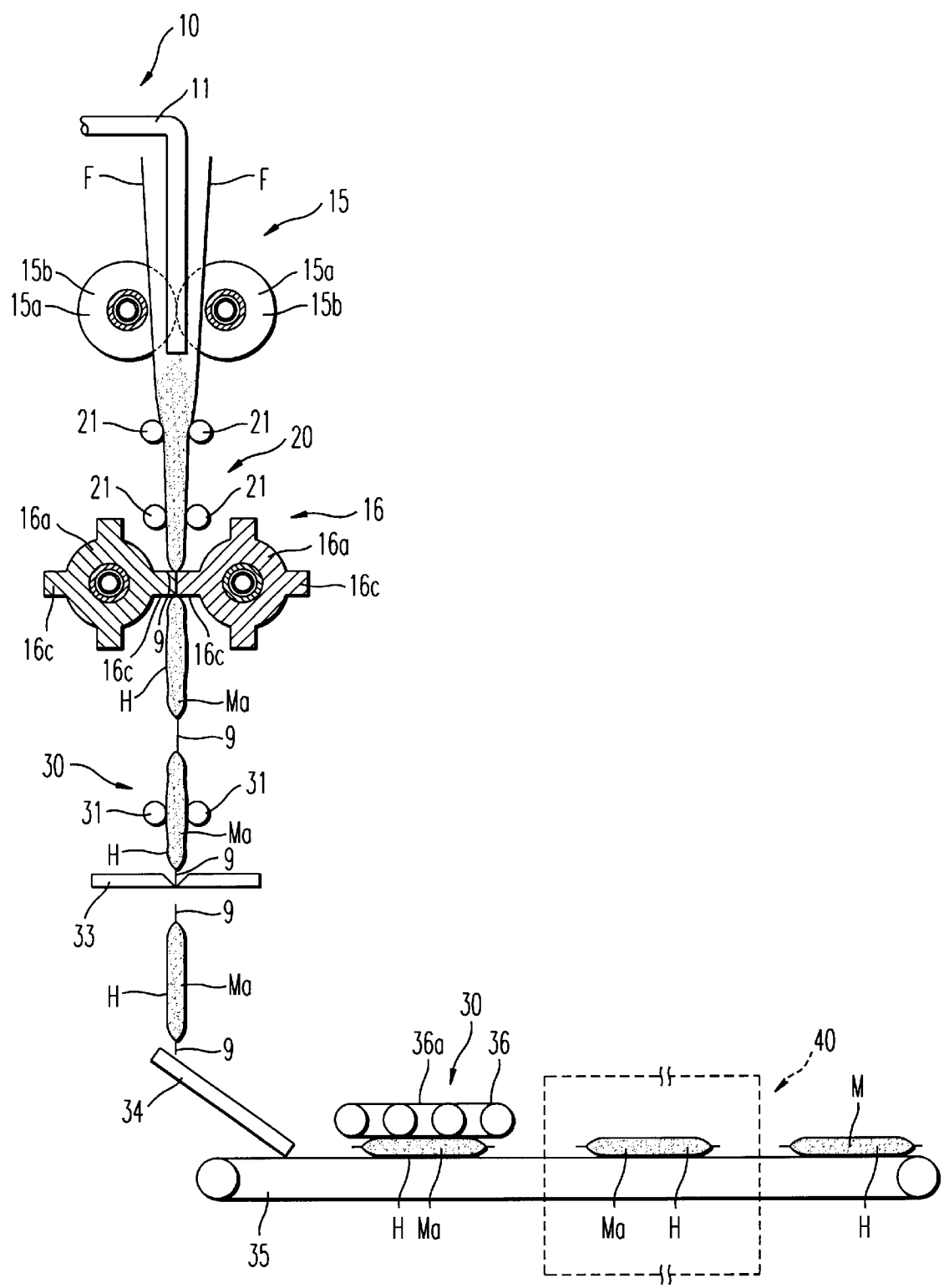
FIG. 1 is a constitutional side view illustrating an outline of a method of manufacture according to an embodiment.
Figure 2:
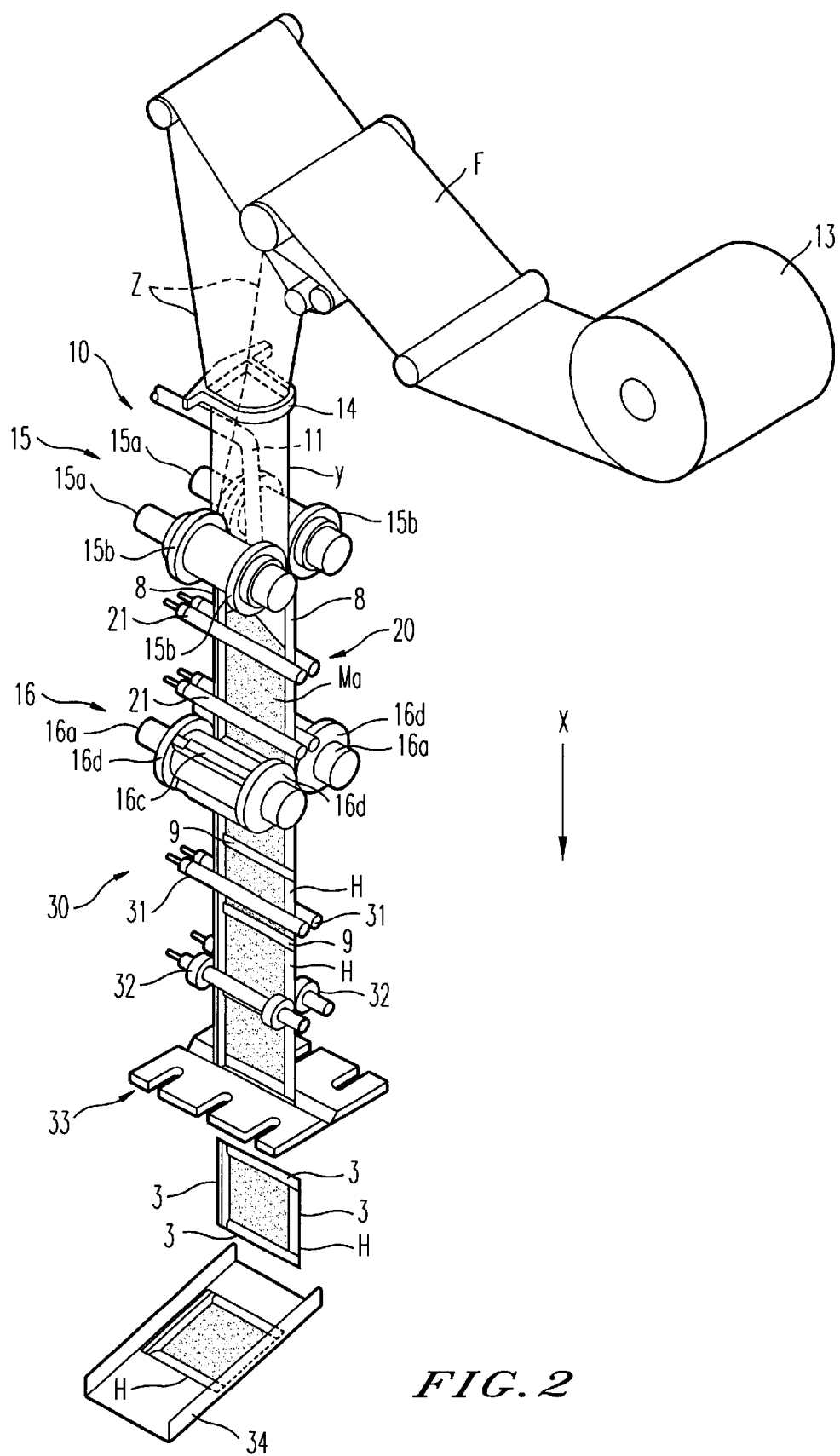
FIG. 2 is a constitutional perspective view illustrating an outline of the method of manufacture according to the embodiment.

The method according to the Embodiment includes steps 10, 20, 30, and 40, schematically illustrated in FIGS. 1 and 2.

In a first step, a film F having a sealant layer, which is thermally sealed so that interfacial peeling, ply separation, or cohesive failure can occur when desired, is conveyed; a three-sided sealed package bag or a four-sided sealed package bag is successively and continuously formed by first thermal seals 8 in FIG. 2 continuously provided in a conveying direction X of the film F and second thermal seals 9 provided in a direction perpendicular to the conveying direction X with an interval; and a constitutional material Ma of the raw hamburger-like matter is filled between one of the second thermal seals 9, provided, and the other of the second thermal seals 9 subsequently provided. This step is a filling step 10.

The constitutional material Ma of the raw hamburger-like matter, filled in the filling step 10, contains a fundamental material of minced or mashed one kind or more of flesh (e.g. beef, pork, horse meat, sheep meat, goat meat, and flesh of domestic fowls), fish meat (e.g. whale, sardine, and shrimp), and vegetable protein; and an additional material of a liaison (e.g. bread crumbs and wheat flours), minced vegetable (e.g. onion chopped into fine pieces), seasonings, and spices.

The three-sided sealed package bag is a package bag formed by a three-sided sealed package. Such a three-sided sealed package is made by continuously providing the first thermal seal 8 in a direction along the conveying direction x of the film F and providing second thermal seals 9 in a direction perpendicular to the conveying direction x with an interval, while conveying the film F having a continuous length in a state that a longitudinal direction of the doubled film F is along the conveying direction x, whereby sealed portions 3 are formed in at least three sides except for a doubled side y; and a package bag H, enclosing the constitutional matter Ma, is successively and continuously formed.

Further, the four-sided package bag H is a package bag formed by a four-sided sealed package. Such a four-sided sealed package is formed by continuously providing a pair of first thermal seals 8 in the conveying direction x of a film F and providing second thermal seals 9 in a direction perpendicular to the conveying direction x with an interval, while conveying the film F in a state that a longitudinal direction of the film F is along the conveying direction x under a condition that the film F having a continuous length is doubled or a pair of films F, F having continuous lengths are oppositely arranged, whereby sealed portions 3 are formed in at least four sides, and the package bag H, enclosing the constitutional material Ma, is successively and continuously formed.

Figure 6:
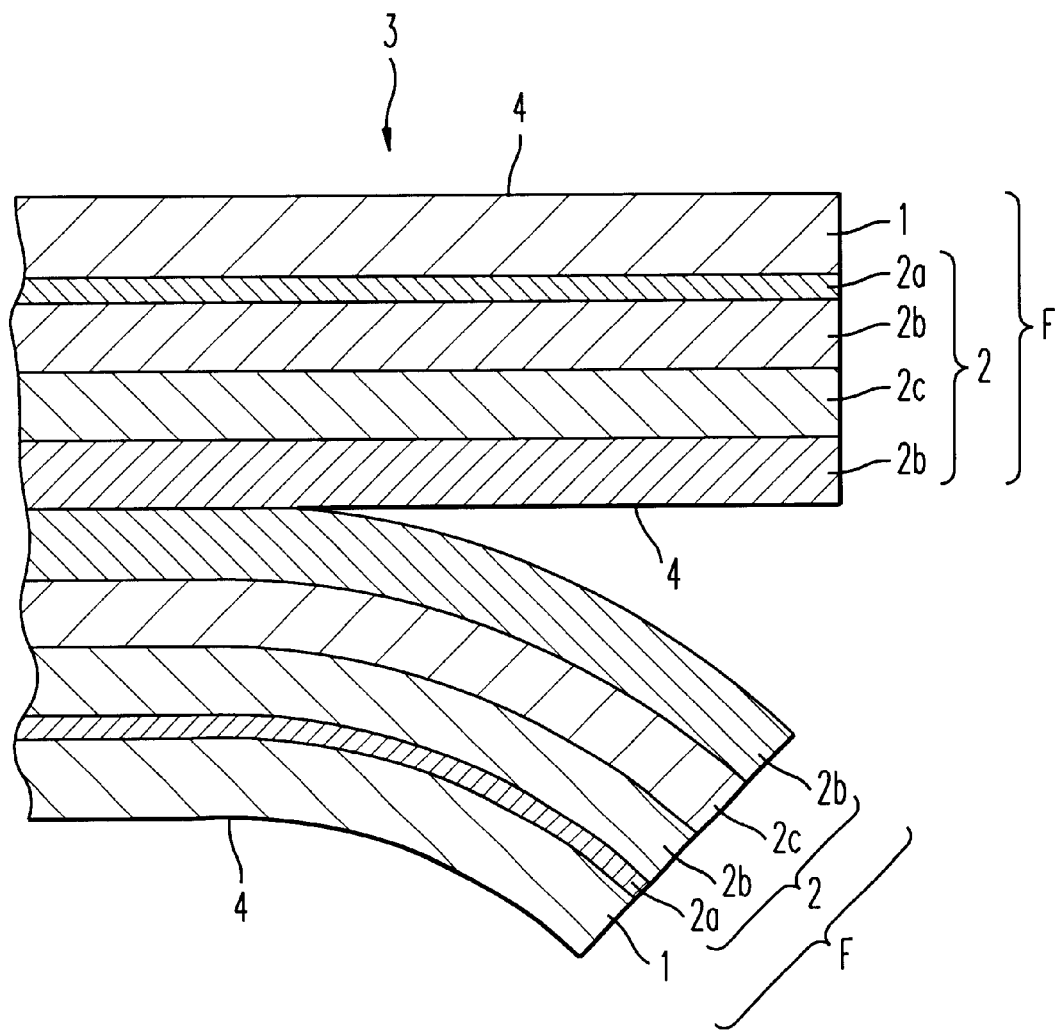
FIG. 6 is an enlarged cross-sectional view illustrating a principal of interfacial peeling.

The film F, to be thermally sealed so that the interfacial peeling can occur, is formed, for example, as seen in FIG. 6 by integrally providing sealant layers 2 respectively fabricated by three layers of an inextensible plastic layer 2b, a bonding film layer 2c, and an inextensible plastic layer, arranged from an inner side to an outer side via an adhesive layer 2a on a surface of a base film 1, which is formed by stretching a plastic film. The package bag is formed by providing thermal seal at a temperature, in which the plastic layer 2b, which is induced in the sealant layer 2 provided on a most upper surface of the sealant layer 2 of the film 4 configurating a surface of the package bag, and the plastic layer 2b, which is included in the sealant layer 2 provided on a most upper surface of the sealant layer 2 of the film 4 configurating the other surface of the package bag, are not firmly fusion-bonded. Therefore, as illustrated in FIG. 6, when the film portions 4, 4 on both surfaces of the package bag are pulled in opposite directions of separation it is possible to easily separate the film portions 4, 4 by breaking the sealed portion 3 at a contact interface 2d of the film portions 4, 4 on both surfaces of the package bag H.

Figure 7:
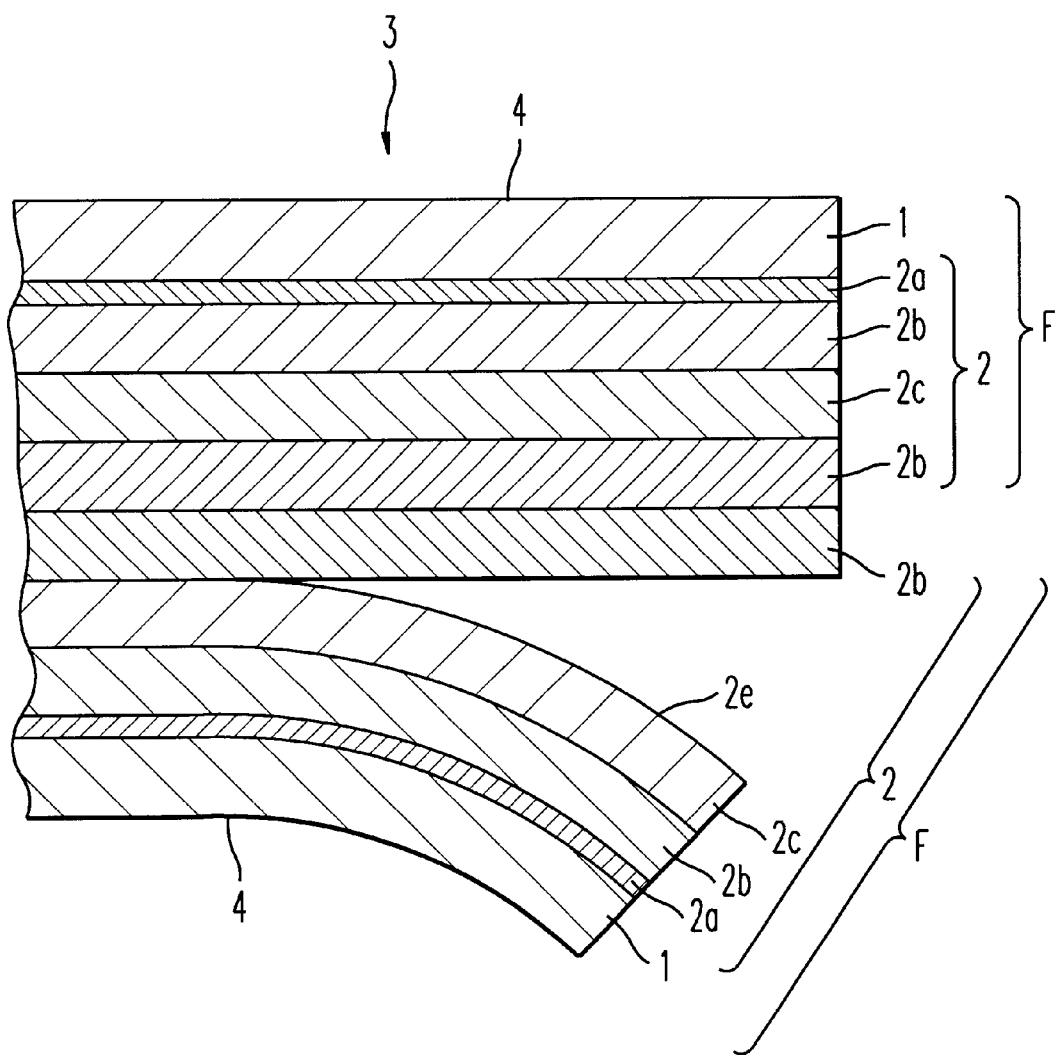
FIG. 7 is an enlarged cross-sectional view illustrating a principal of ply separation.

Further, the film F, to be thermally sealed so that the ply separation can occur is formed, for example, as seen in FIG. 7, by integrally providing sealant layers 2, respectively fabricated by three layers of an inextensible plastic layer 2b, a bonding film layer 2c, and an inextensible plastic layer 2b, arranged from an inner side to an outer side via an adhesive layer 2a on a surface of a base film 1, which is formed by stretching a plastic. The package bag is formed by providing thermal seal at a temperature of firmly fusion-bonding the plastic layer 2b, which is included in the sealant layer 2 provided on a most upper surface of the sealant layer 2 of the film portion 4 configurating a surface of the package bag to the plastic layer 2b, which is included in the sealant layer 2 provided on a most upper surface of the sealant layer 2 of the film portion 4 configurating the other surface of the package bag. Therefore, as illustrated in FIG. 7, when the film portions 4, 4 on both surfaces of the package bag are pulled in directions of separation these film portions 4, 4 can easily be separated by breaking the sealed portion 3 at an interlayer 2e between the bonding film layer 2c and the inextensible plastic layer 2b, both fabricating the sealant layer 2, in one of the film portions 4.

Figure 8:
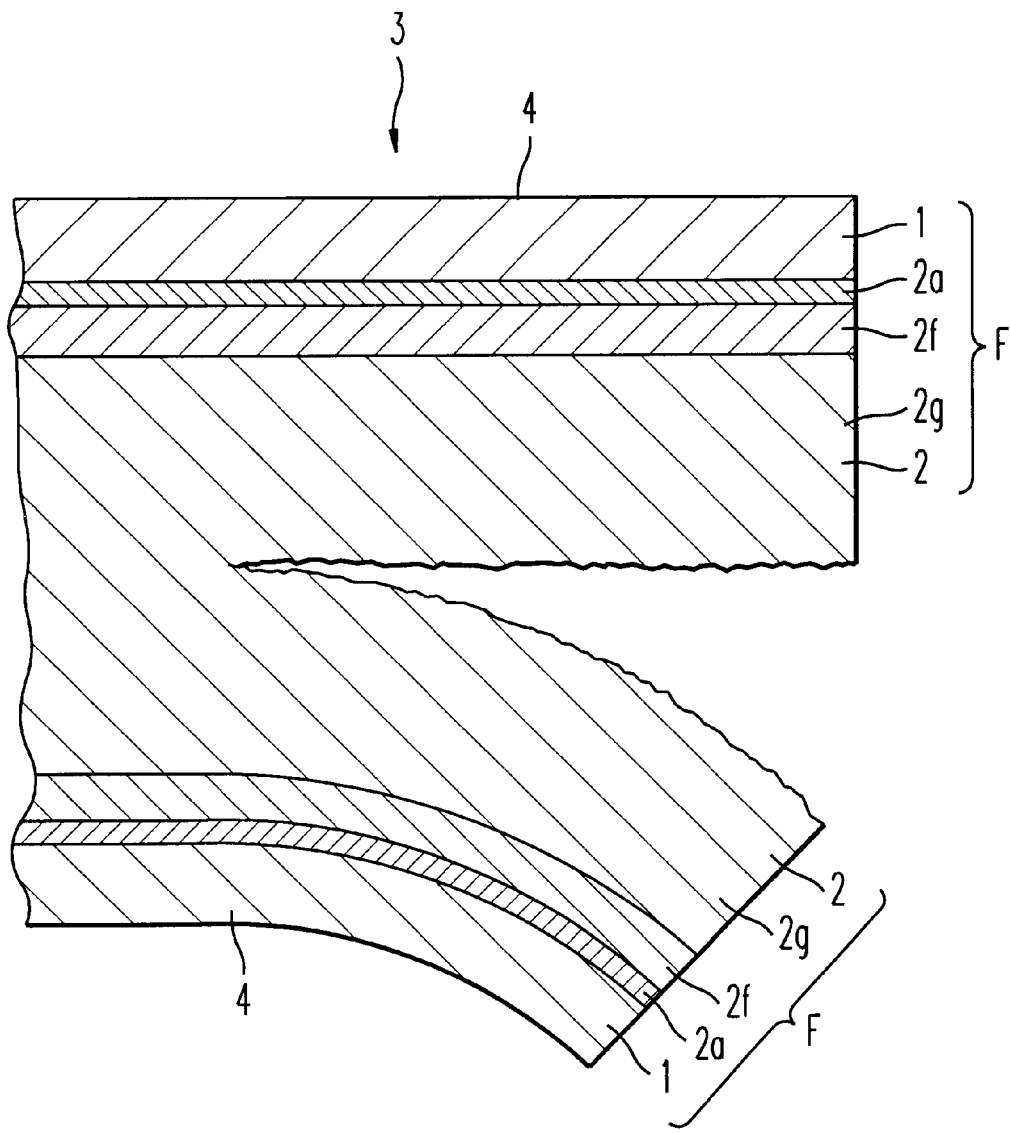
FIG. 8 is an enlarged cross-sectional view illustrating a principal of cohesive failure.

The film F, to be thermally sealed so that cohesive failure can occur, is formed, for example, as seen in FIG. 8, by providing a sealant layer 2 made of a bonding layer 2g, which is fusion-bonded so as to cause the cohesive failure of aluminum foil layers 2f via adhesive layers 2a on surfaces of a base film 1, formed by stretching a plastic. In such a film F, the cohesive failure occurs in the bonding layer 2g in both film portions 4, 4, which are fusion-bonded by thermally sealing when the film portions 4, 4 on both surfaces of the package bag are pulled in directions of separation. Namely, the film portions 4, 4 on both sides can easily be separated by breaking the sealed portion 3 as illustrated in FIG. 8.

A reason why the three-sided package bag or the four-sided package bag is formed by the film F having the sealant layer 2 thermally sealed so that the interfacial peeling, the ply separation, or the cohesive failure layer can occur is that the raw hamburger-like matter is not smoothly taken out of the package bag by only cutting and opening a side of the package bag because of a close contact of an inner surface of the package bag with a surface of the raw hamburger-like matter since the raw hamburger-like matter is supplied after being frozen so that a plate-like shape is maintained in an enclosed state.

Figure 9:
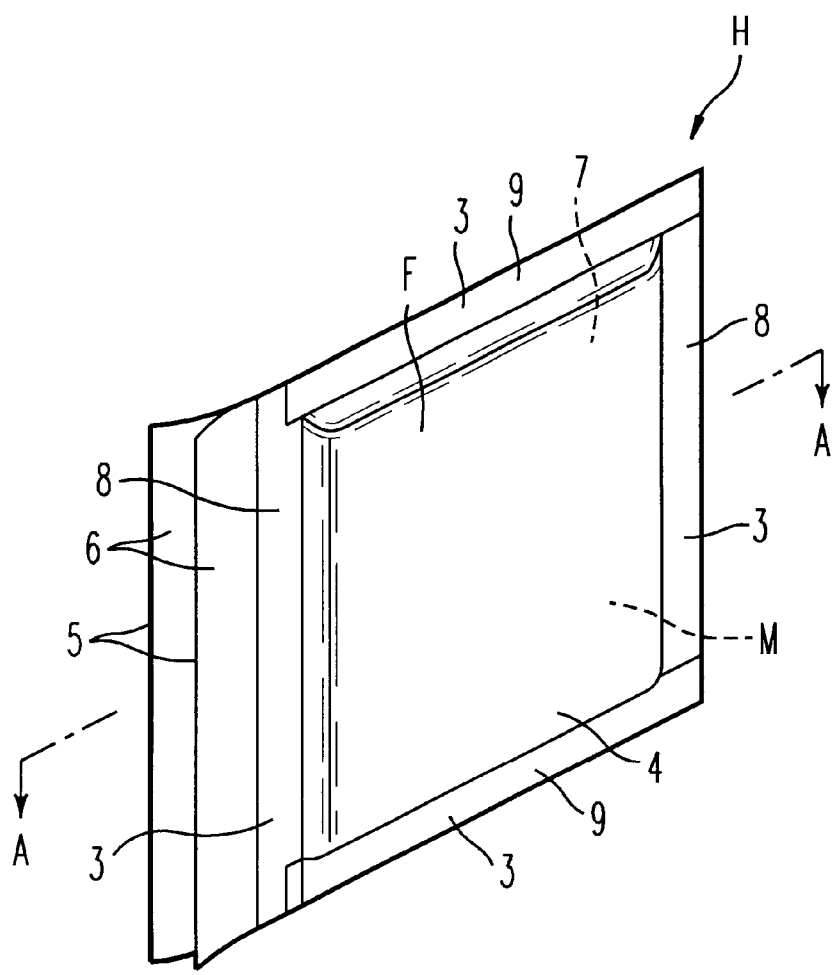
FIG. 9 is a perspective view of a final frozen raw hamburger-like matter packaged by a film.
Figure 10:
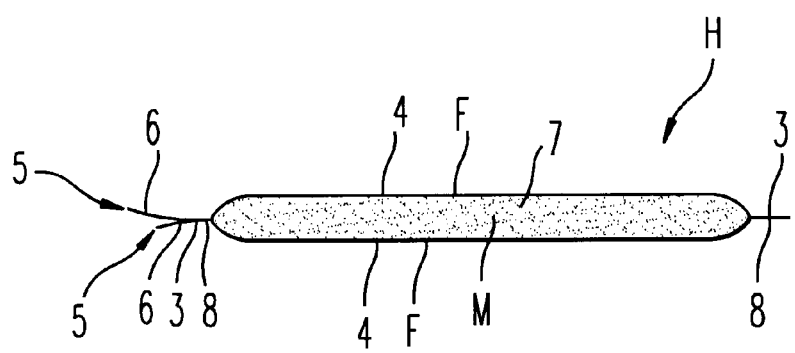
FIG. 10 is a cross-sectional view taken along line A—A of FIG. 9.
Figure 11:
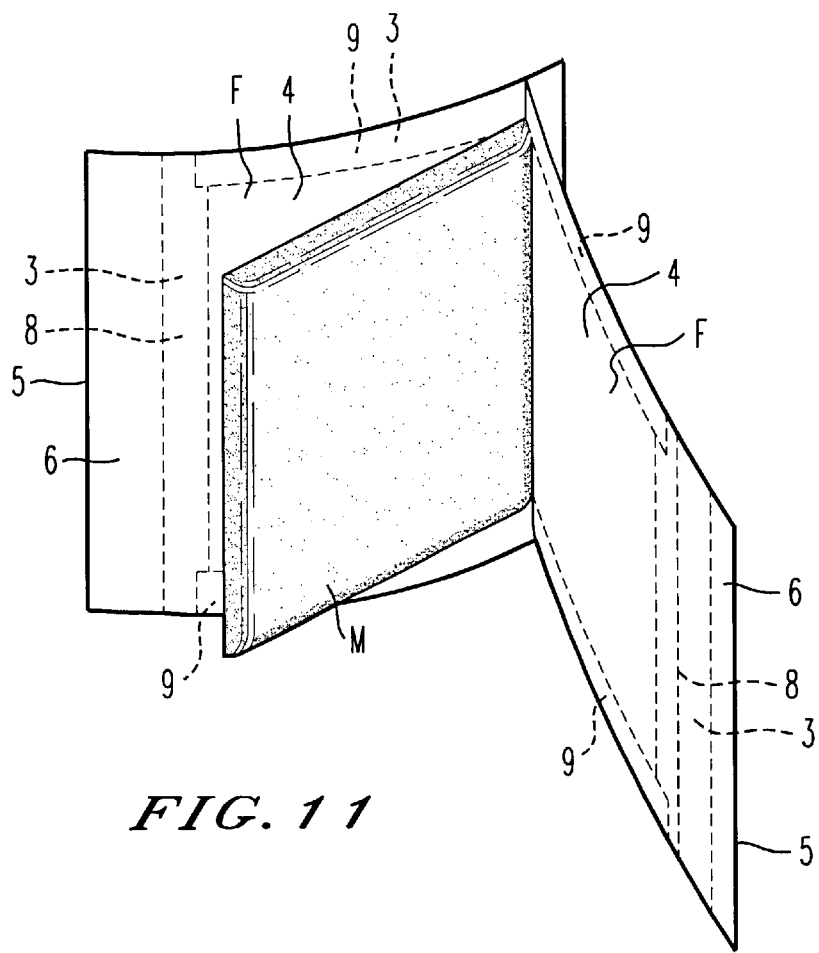
FIG. 11 is a perspective view illustrating a state in which the frozen raw hamburger-like matter is taken out of a package bag in FIG. 9 by opening.
Figure 12:
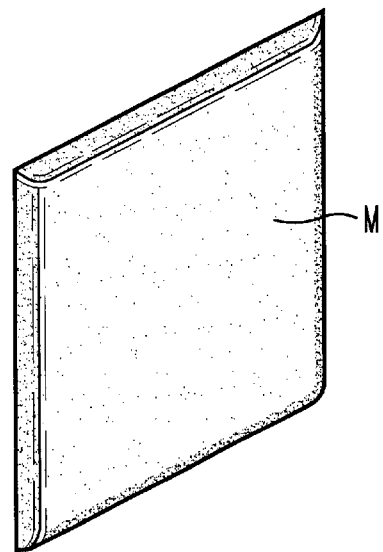
FIG. 12 is a perspective view of the taken out frozen raw hamburger-like matter as illustrated in FIG. 11.

In other words as shown in FIGS. 9 and 10, by forming the three-sided package bag or the four-sided package bag by the film F having the thermally sealed sealant layer so that the interfacial peeling, the ply separation, or the cohesive failure can occur, the sealed portion 3 is easily broken by pulling the film portions 4, 4 on both surfaces of the package bag H in different directions using unsealed portions 6 as stripping margins, which unsealed portion is, provided in the sealed portion 3 between an edge 5 of the film F, positioned in an arbitrary side of the package bag H, and an outer periphery of the sealed portion 3, directed to a side of the edge 5 of the film F. Therefore, as illustrated in FIGS. 9 through 12, by continuously pulling these stripping margins, the sealed portions 3, 3 in two sides of the package bag H, positioned at the edges to the firstly broken above sealed portion 3, are successively broken to enable the film portions 4, 4 on both surfaces to separate on the three sides and easily take out the raw hamburger-like matter M.

The base film 1 in FIGS. 6–8 is preferably an extensible film made of nylon, polyethylene terephthalate, or polypropylene. Because the extensible film made of nylon or polyethylene terephthalate has a property of a gas barrier and rigidity against an impact at a low temperature, a change of properties, such as freeze burn and oil burn, upon contact of the sealed and frozen raw hamburger-like matter with outer air and destruction of the film F at a time of rapidly freezing, storing, and transporting are not easily caused. Further, the extensible film, made of polypropylene, can be supplied at a low cost though the property of a gas barrier and the rigidity at the low temperature are inferior to those properties of the extensible film, made of nylon or polyethylene terephthalate.

From a viewpoint of facilitating an opening operation using the unsealed portions 6 as the stripping margins, as illustrated in FIG. 10, it is preferable that the sealed portion 3 is formed on a side of the unsealed portions 6 in a state that the edges 5 of both film portions 4, 4 are shifted in the unsealed portions 6 so that the edges of the film portions 4 of one surface of the package bag H is positioned on an inner side of the edge 5 of the film portion 4 of the other surface of the package bag H. By shifting positions of the edges 5 of both film portions 4, 4, the edges 5 can be easily picked before pulling the film portions 4 for opening.

Figure 13:
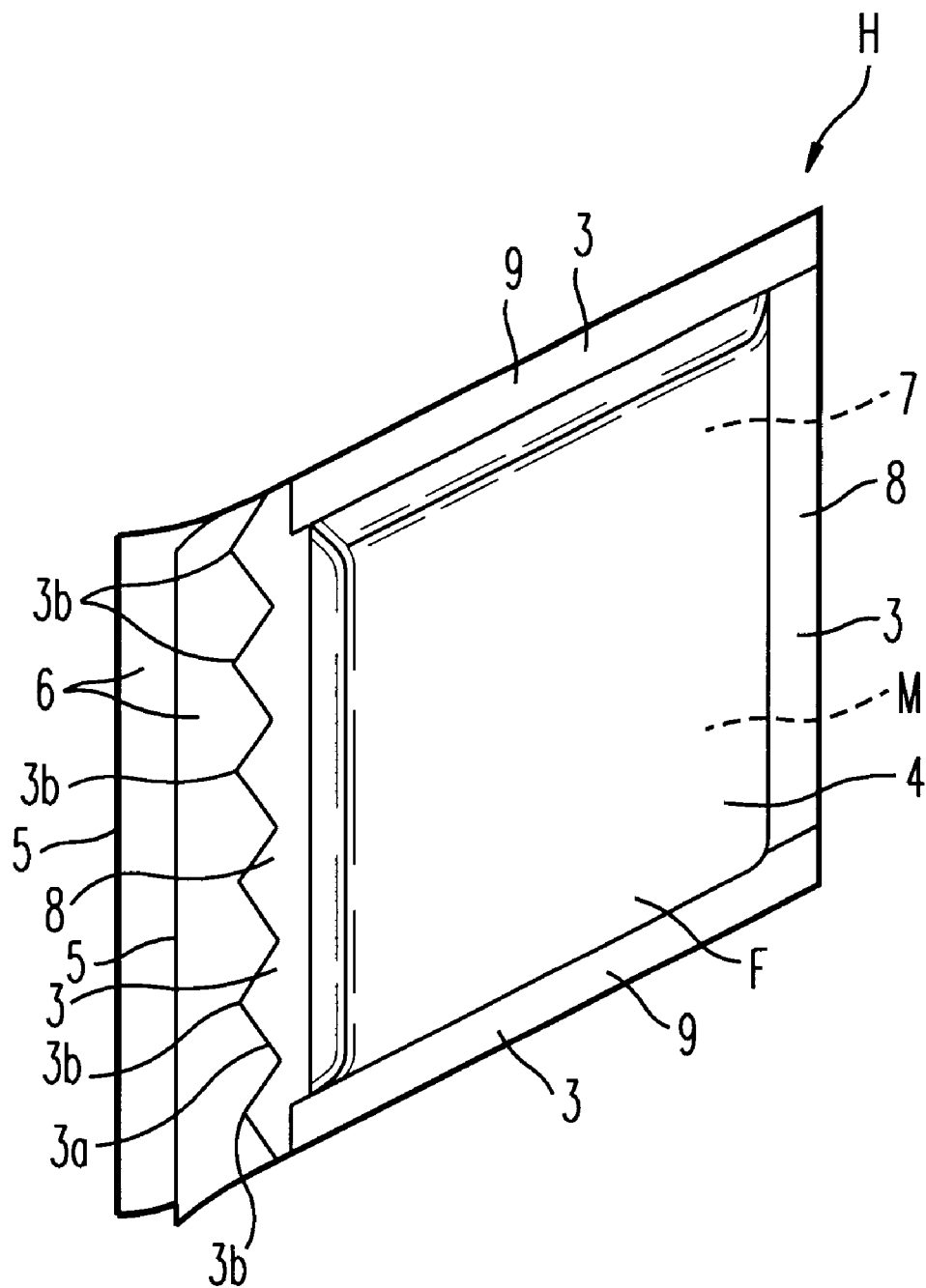
FIG. 13 is a perspective view of the final frozen raw hamburger-like matter packaged by the film, in which a part of a structure is different from that in FIG. 9.

Further, as shown in FIG. 13, from a viewpoint of further facilitating the opening operation using the unsealed portions 6 of the package bag H as the stripping margins, the outer peripheries of the sealed portions 3 on a side of the unsealed portions 6 are preferably formed to have edges 3a in a zigzag shape or a wave-like shape, in which tips 3b are protruded toward the unsealed portions 6, as illustrated in FIG. 13. By forming such sealed portions 3, the sealed portions 3 can be easily broken from a side of the tips 3b by concentrating a tensile force on the tips 3b when both film portions 4, 4 are pulled in separating directions using the unsealed portions 6 as the stripping margins.

Typically, as shown in FIG. 1, a filling pipe 11 for the constitutional material Ma is protruded into an inside of the film F in a flat cylindrical shape with the first thermal seals 8 in FIG. 2 so that a discharge port 11a in FIG. 1 is positioned just above the thermal sealing means 16 for providing the second thermal seals 9. Therefore, the minced constituttional material Ma is continuously or intermittently transferred from the discharge port 11a through the filling pipe 11.

Figure 3:
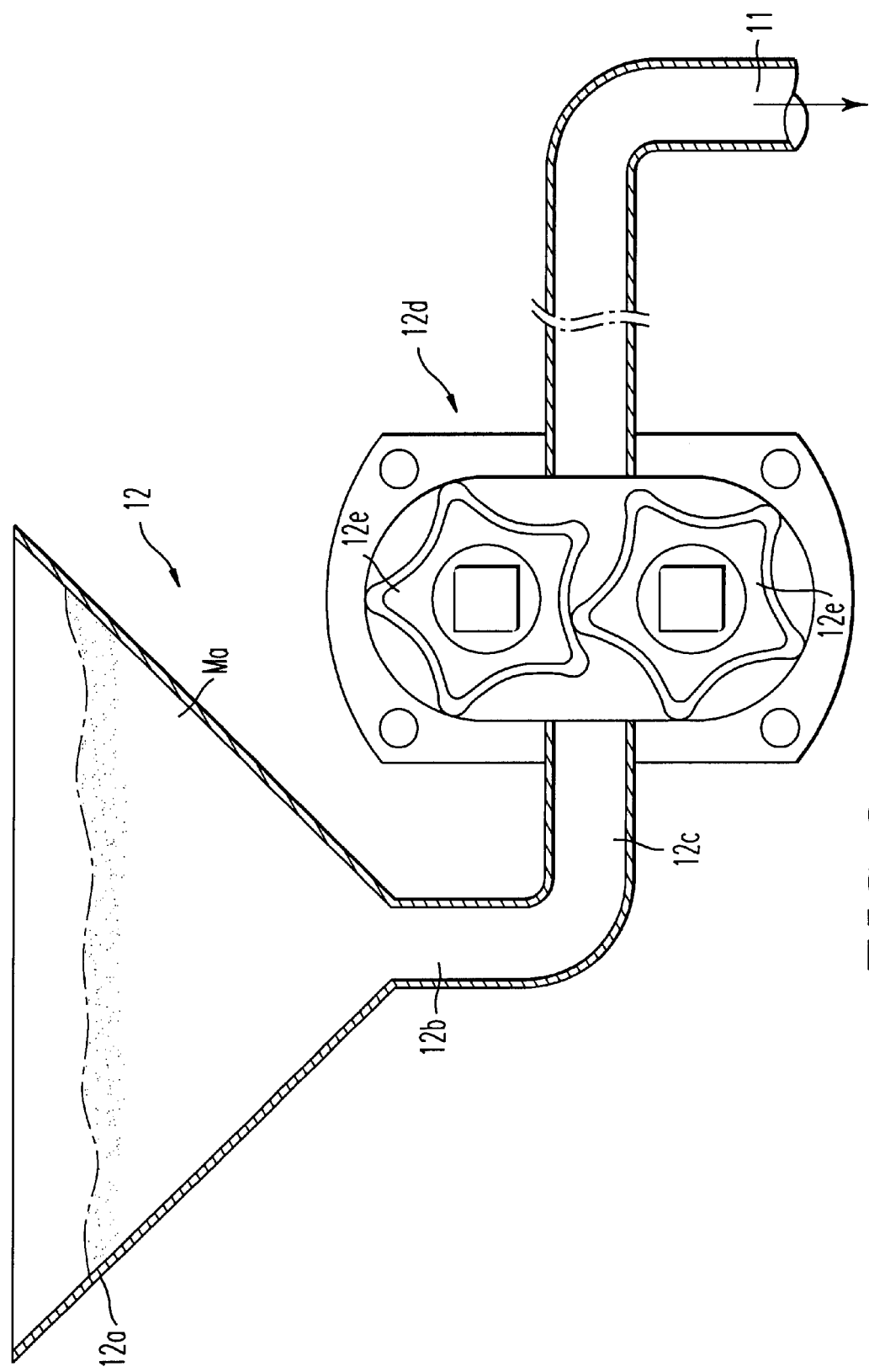
FIG. 3 is a constitutional side view illustrating an example of constructing a filling device.

A mechanism of transferring the constitutional material Ma to the filling pipe 11 is, for example as illustrated in FIG. 3, by a structure including a loading hopper 12a for the constitutional material Ma; an extrusion tube 12c, connected to a bottom opening 12b of the hopper 12a; and a rotary pump 12d, provided in a central portion of the extrusion tube 12c, for extruding the constitutional material Ma, introduced by its own weight or forcibly introduced into the extrusion tube 12c, toward a front end of the extrusion tube 12c, wherein the front end of the extrusion tube 12c is connected to the filling pipe 11. Thus, the constitutional material Ma is supplied from a filling device 12. In FIG. 3, there is also a rotor 12e of the rotary pump.

For example, as illustrated in FIG. 2, the first thermal seals 8 are provided by a thermal sealing means 15 including a pair of longitudinal thermal rolls 15a, 15a, of which rotational axes are arranged in a direction perpendicular to the conveying direction x of the film.

In an example illustrated in FIG. 2, the film F, drawn out of a raw fabric film 13, is once doubled by a doubling means 14; and a pair of the first thermal seals 8 is provided along the doubled side y of the film F and a side z opposite to the doubled side y. In other words, the pair of longitudinal thermal rolls 15a, 15a respectively have annular projections 15b like a flange in both ends of the rolls 15a, 15a, wherein the annular projections 15b draw the film F into an edge on the side y of the doubled film F and the side z opposite to the doubled side y and continuously provide the first thermal seals 8 along with the conveying direction x of the film F by transferring the film F.

The pair of the longitudinal thermal rolls 15a, 15a have a structure that the doubled film is drawn in the doubling means 14 between the projections 15b, which approach each other respectively on sides facing the other longitudinal thermal roll 15a, and the longitudinal thermal rolls 15a are adversely rotated so that the drawn film F is transferred on a side of the thermal sealing means 16 for providing the second thermal seals 9.

For example, the second thermal seals 9 are provided by second thermal sealing means 16 including a pair of lateral thermal rolls 16a, 16a, of which rotational axes are arranged in a direction perpendicular to the conveying direction x of the film F as illustrated in FIG. 2.

In an example illustrated in FIG. 2, such a pair of the lateral thermal rolls 16a, 16a respectively has a protrusion 16c in directions of its rotational shaft, which protrusions 16c draw the film F, provided with the first thermal seals 8 by the pair of longitudinal thermal rolls 15a, 15a, and sequentially provide the second thermal seals 9 with a predetermined interval.

In this embodiment, the lateral thermal rolls 16a respectively have flanges 16d on both ends and the protrusions 16c between the flanges 16d. A plurality of the protrusions 16c is formed along a rotational direction of the lateral thermal rolls 16a with an interval. The protrusions 16c respectively of the pair of the lateral thermal rolls 16a, 16a sequentially face each other on a facing side of the lateral thermal rolls 16a; and the second thermal seals 9 are intermittently provided for the film F having a continuous length, drawn between the pair of the lateral thermal rolls 16a, 16a by these approaching protrusions 16c.

In the next section, the second step is a deaerating step 20 of pressing the film F so that the filled constitutional material Ma is spread until the second thermal seal 9 is subsequently provided.

The deaerating step 20 is firstly established to remove air contained in the constitutional material Ma, filled in the filling step 10, as throughly as possible by the time that the second thermal seal 9 is subsequently provided to remove the excessive air from the constitutional material Ma, filled in the package bag H. The constitutional material Ma is densely spread in a space between the previously provided second thermal seal 9 and the subsequently provided second thermal seal 9 in the film F, formed in a flat cylindrical shape by the first thermal seals 8 by the time that the second thermal seal 9 is subsequently provided to prevent air, enclosed by a remaining space in the package bag H, from remaining.

By this deaerating step 20, it is possible to fill the constitutional material Ma in a state that the excessive air is not left in the package bag H as throughly as possible and to prevent a change of property of the raw hamburger-like matter M caused by such air from occurring as throughly as possible, whereby it is possible to enable a long term storage by freezing.

In the example illustrated in FIGS. 1 and 2, two pairs of choking rollers 21, 21, of which rotational axes are perpendicular to the conveying direction x of the film F, are horizontally provided between the discharge port 11a of the filling pipe 11 and the pair of the lateral thermal rolls 16a, 16a. The deaerating step 20 is processed by making the film F, which is filled by the constitutional material Ma, pass through the pairs of choking rollers 21, 21. In other words, the filled film F is pressed by the pairs of the choking rollers 21, 21 so that the constitutional material Ma in the film F is ground and spread. Therefore, air or the like, contained in the constitutional material Ma supplied from the filling pipe 11, upward escapes before the second thermal seal 9 is subsequently provided by the pair of lateral thermal rolls 16a, 16a.

In the next section, the third process is a forming step 30, in which the plate-like raw hamburger-like mattera is formed by pressing the filled package bag H to equalize the density so as to spread in the package bag H.

The forming step 30 firstly forms the filled constitutional material Ma to be a plate-like shape, as shown in FIGS. 9 and 10, corresponding to an inner space 7 of the package bag, specifically to be the raw hamburger-like matter M being in a plate-like shape corresponding to the flat and rectangular inner space 7, formed by inner peripheries of the first thermal seals 8 and inner peripheries of the second thermal seals 9. Because such first thermal seals 8 and such second thermal seals 9 are regularly formed in FIG. 2 by the longitudinal thermal rolls 15a and the lateral thermal rolls 16a, each of continuously formed raw hamburger-like matters packaged in each of the package bags, H, H, is made to be substantially the same raw hamburger-like matter, whereby a stable supply of commodities having identical specifications becomes possible. Further, there is a case that, in the three-sided sealed package bag and the four-sided sealed package bag, another first thermal seal 8 is further provided between the sides of the package bag H along the conveying direction X of the film F to make inner spaces as much as two or more in the package bag H. In such a case, rectangular plate-like raw hamburger-like matters M, as much as two or more, are formed and sealed in a single package bag H. This first thermal seal 8 for forming the inner spaces in the package bag H is formed by further providing the flange-like projections 15b in a middle of the pair of the lateral thermal rolls 15a, 15a. Further, by providing thermal seals 8, 9 so that shoulders of inner edges of each of the thermal seals 8, 9 are radiused, plate-like raw hamburger-like matters, of which shoulders are radiused, is formed.

In the second place, in the forming step 30, the constitutional material Ma, filled in the package bag H, is made to be a raw hamburger-like matter so that the raw hamburger-like matter is appropriately frozen within a short time in the following freezing step.

In the third place, by making the constitutional material Ma, filled in the package bag H, to be the plate-like raw hamburger-like matter, final consumers can easily cook within a short time when they open the package bag edge and heat the raw hamburger-like matter, and the raw hamburger-like matter is shaped like a substantially square plate so that it is sandwiched or topped on a bread or the like.

In the example illustrated in FIGS. 1 and 2, a pair of equalizing rollers 31, 31, of which rotational axes are perpendicular to the conveying direction x of the film F, is provided in a succeeding position to the pair of the lateral thermal rolls 16a, 16a. The package bag H, filled by the constitutional material Ma and sequentially formed, passes between the pair of the equalizing rollers 31, 31. The constitutional material Ma is formed by the equalizing rollers 31 so that the material is spread to have an equal thickness in the entire inner space of the package bag H.

Further, in the example illustrated in FIGS. 1 and 2, lead-out rollers 32, 32 are provided in a succeeding position to the pair of equalizing rollers 31, 31 for conveying the continuously formed package bag H; and a cutting means 33 is provided in a succeeding position to the lead-out rollers 32 for cutting the continuously formed package bags H into individual package bags H by cutting within a width of the second thermal seals 9.

Figure 4:
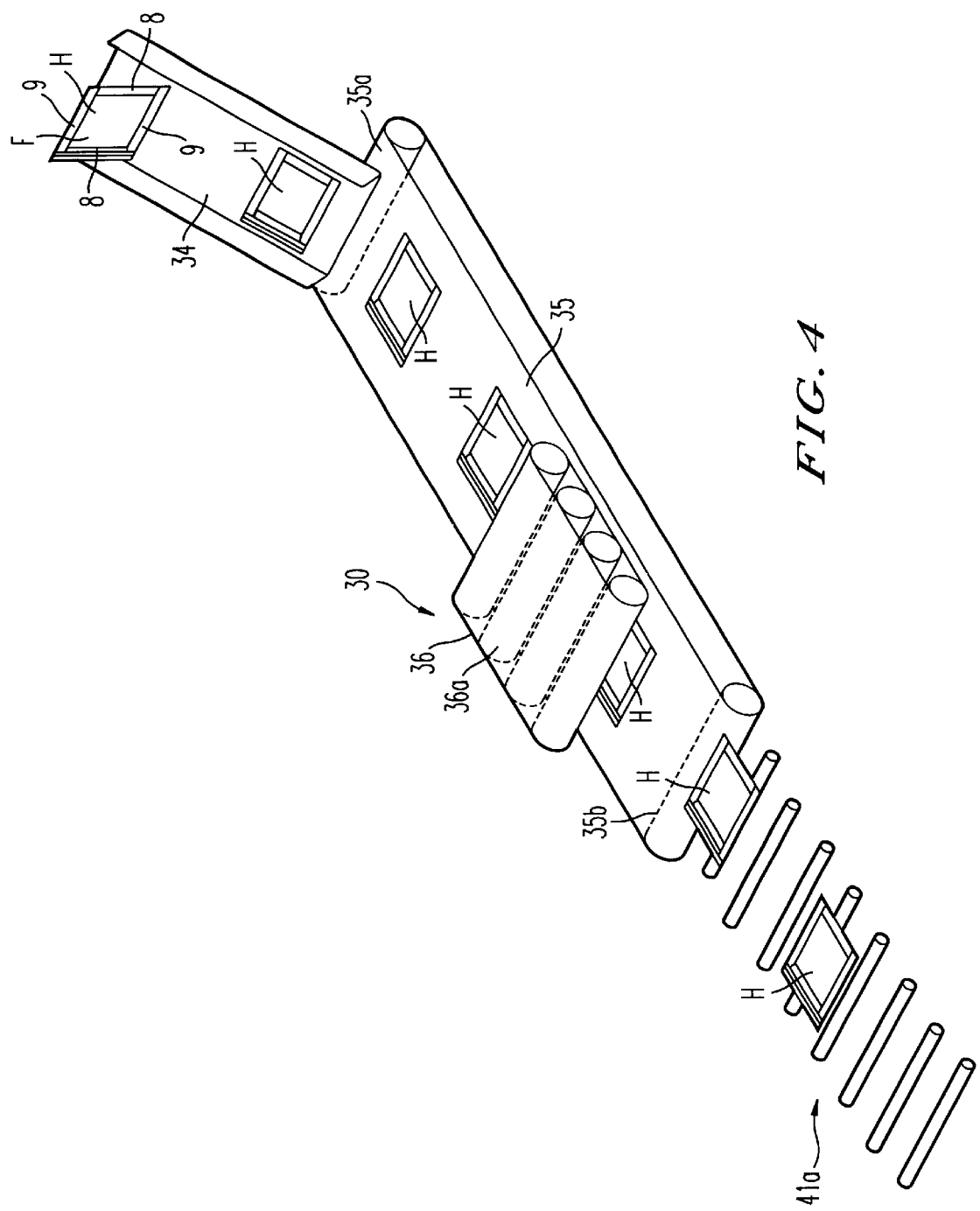
FIG. 4 is a constitutional perspective view illustrating an embodiment of the forming process.

As in FIG. 4, the package bags H, divided by the cutting means 33, slide on a guide plate 34 and are transferred to an end 35a of a belt conveyer 35 for transferring the package bags H one by one to a cooling device (not shown) on a side of receiving load.

Further, in the example illustrated in FIG. 1, a pressing means 36 having an orbital belt 36a, of which a lower surface downwardly presses the package bag conveyed by the belt conveyer 35, is provided in the belt conveyer 35 as illustrated also in FIG. 4. The constitutional material is spread in the entire inner space of each of the package bags H, H, to have an equal thickness in an interval between the pressing means 36 and the belt conveyer 35. In the above example, the pressing means 36 also demonstrates a function of the forming step 30.

Figure 5:
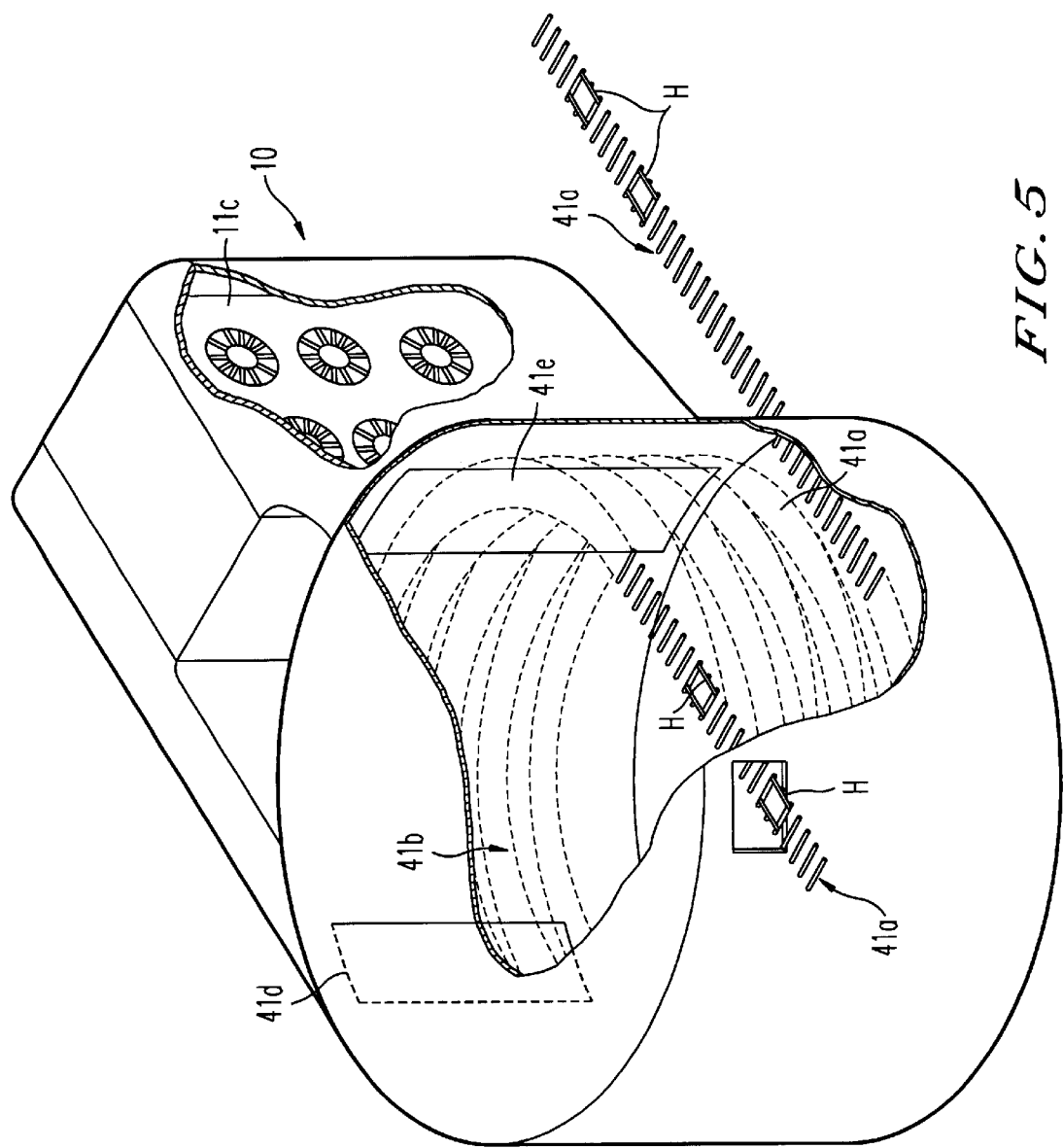
FIG. 5 is a constitutional perspective view illustrating an example of a freezing process.

The fourth step shown in FIG. 5 is a freezing process 40 for rapidly freezing the package bag H, enclosing the equalized plate-like raw hamburger-like matter, and maintaining its shape by freezing.

The freezing process 40 has following features.

In the first place, the raw hamburger-like matter M in the package bag H, obtained by forming the constitutional material to be in a substantially rectangular plate-like shape in the forming step, is prepared so that it can be served to a final consumer as a food while maintaining its shape to be like a substantially rectangular plate; and a shape of a cooked hamburger-like matter, obtained by heating the raw hamburger-like matter after opening the package bag H by a final consumer, is maintained to be like a substantially rectangular plate.

In the second place, the raw hamburger-like matter can be stored for a long term.

Such rapid freezing is typically realized by transferring the package bags H into a freezer 41b having an atmosphere of −35° C. through −40° C.

FIG. 5 illustrates an example of realizing such rapid freezing by a rapid freezing device including a spiral roller conveyer in its freezer 41b, which roller conveyer is provided on an unloading side of the belt conveyer. In FIG. 5, therein a heat exchanger 41c configurating the rapid freezing device; an inlet port 41d of a cooling air from the heat exchanger 41c; and suction port 41e for circulating the cooling air from the freezer 41b to the heat exchanger 41c.

The present invention provides effects of easily making a plate-like raw hamburger-like matter suitable for transportation, storage, and preservation, which is easily cooked, and suitable for heating in a manner such that it is easily sandwiched in a mode of avoiding deterioration of quality such as freeze burn as throughly as possible, without excessively complicating a line of production.

Obviously, numerous modifications and variations of the present invention are possible in light of the above teachings. It is therefore to be understood that, within the scope of the appended claims, the invention may be practiced otherwise than as specifically described herein.

What is claimed is:

1. A method of making a flat frozen raw hamburger matter, comprising steps of:

filling a constitutional material of raw hamburger material between a first thermal seal, continuously provided along a conveying direction of a film having a thermally sealed sealant layer so that one of interfacial peeling, ply separation, and cohesive failure can occur when desired, and second thermal seals subsequently provided, while sequentially and continuously forming one of a three-sided sealed package bag and a four-sided sealed package bag by said second thermal seals provided in a direction perpendicular to the conveying direction with an interval therebetween;

deaerating the package bag by pressing said film after said filling step and before providing the subsequent second thermal seal, so that the constitutional material is extended until a latter of said subsequently provided second thermal seals is conducted;

forming the constitutional material, pressed and filled in said package bag, by equalizing the raw hamburger matter so as to be spread in said package bag; and freezing the package bag enclosing said matter for maintaining a shape of the raw hamburger matter by rapidly freezing said package bag enclosing the equalized raw hamburger matter.

2. A method according to claim 1, wherein:

said freezing step includes a substep of transferring the package bag enclosing said matter into a freezer having an atmosphere of −35° C. through −40° C. for rapidly freezing said package bag enclosing the equalized raw hamburger matter.

* * * * *